(12) United States Patent
Ricks et al.

(10) Patent No.: US 12,613,672 B2
(45) Date of Patent: Apr. 28, 2026

(54) DERIVING PERSONAL DISPLAY CONTENT FROM SCREEN CAPTURE OF PRIMARY DISPLAY

(71) Applicant: Six15 Technologies, Henrietta, NY (US)

(72) Inventors: Theodore K. Ricks, Pittsford, NY (US); Paul S. Repka, W. Henrietta, NY (US); Alexander K. Sojda, Rochester, NY (US)

(73) Assignee: Six15 Technologies, Henrietta, NY (US)

( * ) Notice: Subject to any disclaimer, the term of this patent is extended or adjusted under 35 U.S.C. 154(b) by 166 days.

(21) Appl. No.: 18/443,434

(22) Filed: Feb. 16, 2024

(65) Prior Publication Data

US 2024/0289082 A1 Aug. 29, 2024

Related U.S. Application Data

(60) Provisional application No. 63/447,696, filed on Feb. 23, 2023.

(51) Int. Cl.
*G06F 3/14* (2006.01)
*G06V 30/14* (2022.01)

(52) U.S. Cl.
CPC ........ *G06F 3/1454* (2013.01); *G06V 30/1444* (2022.01); *G06V 2201/02* (2022.01)

(58) Field of Classification Search
CPC .............. G06F 3/1454; G06V 30/1444; G06V 2201/02; G06V 30/10; G06V 30/142
See application file for complete search history.

(56) References Cited

U.S. PATENT DOCUMENTS

| | | | | |
|---|---|---|---|---|
| 10,083,365 | B2 * | 9/2018 | Schiller | A61B 5/72 |
| 2015/0310290 | A1 * | 10/2015 | Cuthbert | G06F 40/58 382/182 |
| 2016/0189314 | A1 * | 6/2016 | Nakayama | G06V 30/412 705/30 |
| 2017/0004373 | A1 * | 1/2017 | Horiuchi | G06V 20/62 |
| 2017/0103124 | A1 * | 4/2017 | Hassan | G06V 20/20 |
| 2019/0087656 | A1 * | 3/2019 | King | G06Q 30/00 |
| 2019/0228252 | A1 * | 7/2019 | Peng | G06V 30/147 |
| 2020/0042837 | A1 * | 2/2020 | Skinner | H04L 63/102 |
| 2021/0342914 | A1 * | 11/2021 | Dalal | G06V 20/20 |
| 2021/0365836 | A1 * | 11/2021 | Wilkins | G02B 27/0018 |
| 2024/0143161 | A1 * | 5/2024 | Sisselman | G06F 3/04883 |

OTHER PUBLICATIONS

Shapiro, Daniel. Composing recommendations using computer screen images: a deep learning recommender system for PC users. Diss. Université d'Ottawa/University of Ottawa, 2017. (Year: 2017).*

* cited by examiner

*Primary Examiner* — Daniel F Hajnik
*Assistant Examiner* — Thomas John Foster
(74) *Attorney, Agent, or Firm* — Louis S. Horvath

(57) ABSTRACT

A method acquires a screen capture, as a pixelated image, having text content from a first display on a first display device and processes the acquired pixelated image of the first display using optical character recognition to extract one or more alphanumeric text strings from the displayed text content. The first display device transmits the one or more extracted text strings from the first display to a second display device. At least the one or more extracted text strings are rendered on the second display device.

15 Claims, 9 Drawing Sheets

Pick to Tote
Tote: 7222819810
Aloc: 136-018-A01
Item: 3357339
Qty: 24 Unit

DERIVING PERSONAL DISPLAY CONTENT FROM SCREEN CAPTURE OF PRIMARY DISPLAY

The present application claims the benefit of U.S. Provisional application Ser. No. 63/447,696, provisionally filed on Feb. 23, 2023, entitled "DERIVING PERSONAL DISPLAY CONTENT FROM SCREEN CAPTURE OF PRIMARY DISPLAY" in the name of Theodore K. Ricks et al., incorporated herein by reference in its entirety.

FIELD OF THE INVENTION

The present application is directed to display of instructive content from an originating system on a wearable display or other display that is positioned in front of a viewer.

BACKGROUND OF THE INVENTION

The advent of handheld and wearable personal electronic displays allows systematized instructional content to be displayed to a viewer in order to support task execution. In warehousing applications, for example, various types of displays can be provided to a worker whose function is to locate and procure a succession of items according to an order listing. To help support this and similar types of dedicated tasks, any of a number of handheld or wearable personal display devices have been adapted, providing instructions for obtaining items such as a storage location, an item identifier, an item count, and the like. The use of portable display devices for warehouse worker assistance can help to streamline workflow and boost the overall speed and efficiency with which orders are serviced and shipped. From a broader aspect, it can be appreciated that for many functions requiring a sequence of tasks, such as in industry, medical care, or product delivery, providing instructions to specific personnel helps to eliminate confusion, improves tracking and workflow, and leads to improved efficiency.

Among display devices that have been adapted for this purpose are head-mounted displays (HMDs) and other types of hands-free and heads-up display (HUD), including display devices that may be mounted against other anatomy or on clothing, tools, vehicles, or other objects in view of the intended user. As one example, an HMD configured for this purpose has a display controlled from a remote CPU that allows a member of the warehousing staff, when wearing the HMD with the display suitably activated and in signal communication with the remote server, to work through each item in a picking list, efficiently locating and obtaining the item. In conventional workflow, the item can then be scanned for verification and for inventory tracking and linked to a particular customer order, for example.

In order to display instructions on the HMD, a software application (or "app") is required. At each warehouse site, a proprietary software application, typically stored and executed on HMD control circuitry, allows the computer system that originates an order to display suitable information content on the HMD.

The task of writing the proprietary software that provides the interface between the HMD and the originating computer system is non-trivial and can be costly. Each warehouse site, for example, can have a customized inventory control and ordering system that manages incoming and outgoing inventory, tracks order handling, stores location and identification data for individual items, etc. In many cases, the originating system for an ordered product can include software components written many years earlier, in outdated code formats that are unfamiliar to the current generation of software engineers. Moreover, management personnel are often wary of making changes or access calls to existing software logic, where the systems have been adapted and improved over many years and operating personnel, even when familiar with how to use and maintain such systems, are reluctant to alter.

Yet another complication that can make it difficult to extract data from existing systems and software packages relates to the fact that different vendors can be involved with different areas of the software. In some cases, companies are reluctant to work with competitors or with third-party vendors who, in some cases, maintain rights to various related proprietary software, for example.

It can thus be appreciated that significant complexity can hinder or even block the use of wearable displays in warehousing and other environments, even though the advantages of these devices are widely realized. Obstacles that can result from working with unfamiliar or even antiquated systems, negotiating with reluctant third-party companies, and providing a display interface that can be implemented, managed, and changed as needed, can seem insurmountable in some cases, making it difficult to obtain potential efficiency and cost benefits.

Thus, there is a need for solutions to the interface problems that face HUD developers and allow the advantages of HUD technology to be more readily accessed for existing applications.

SUMMARY OF THE INVENTION

It is an object of the present disclosure to address the need for straightforward solutions to human interface generation and development for wearable displays and other types of HUDs.

With this object in mind, embodiments according to the present disclosure provide a method comprising:

(a) acquiring a screen capture, as a pixelated image, comprising text content from a first display on a first display device;

(b) processing the acquired pixelated image of the first display using optical character recognition to extract one or more alphanumeric text strings from the displayed text content;

(c) transmitting the one or more extracted text strings from the first display device to a second display device; and (d) rendering the one or more extracted text strings on the second display device.

BRIEF DESCRIPTION OF DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1A:
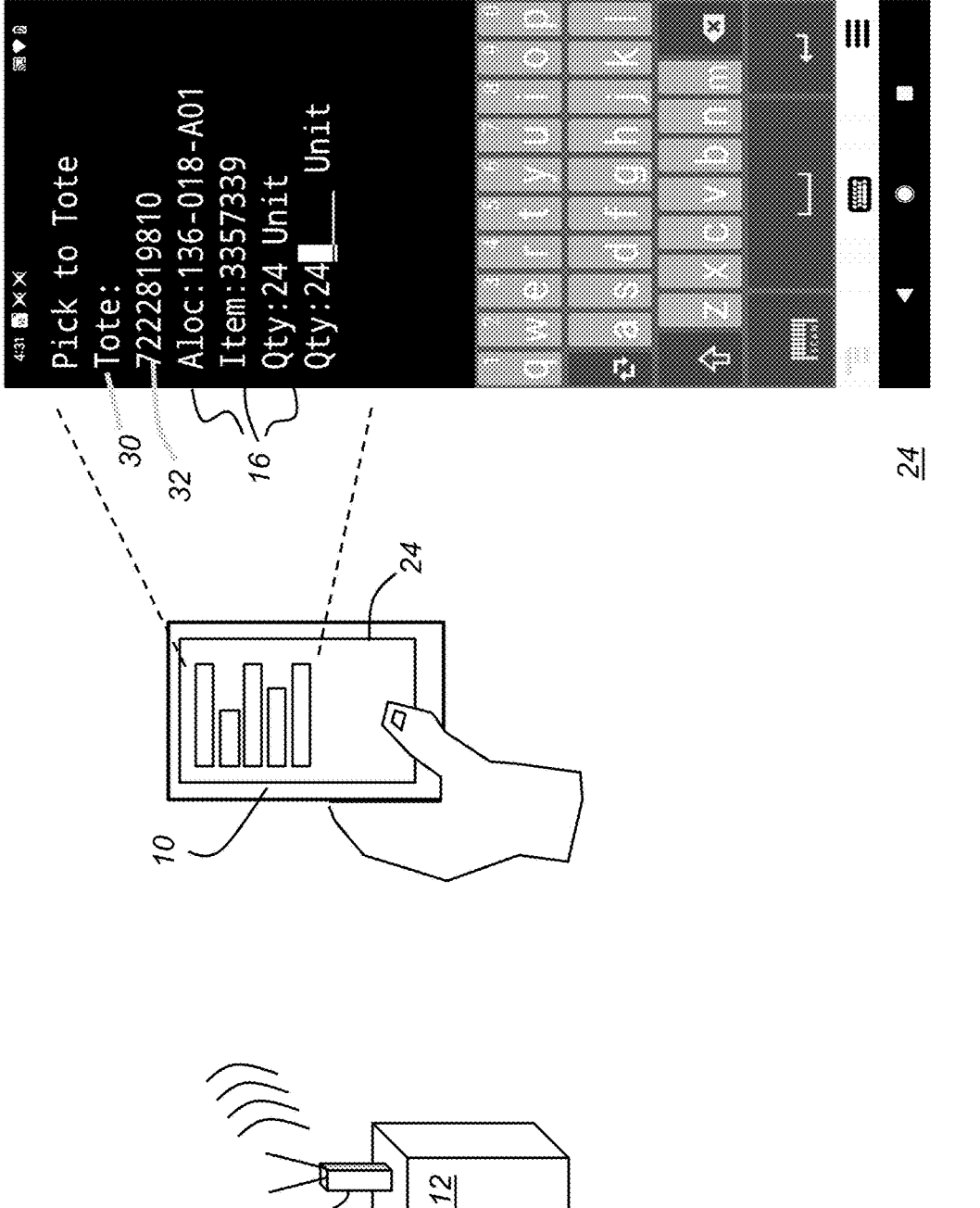
FIG. 1A is a schematic diagram that shows conventional use of a handheld display to show task-oriented instructional information for a viewer.

Figures provided herein are given in order to illustrate principles of operation and component relationships according to the present invention and may not be drawn with intent to show actual size or scale. Some exaggeration may be necessary in order to emphasize basic structural or functional relationships or principles of operation. Some conventional components that would be needed for implementation of the described embodiments, such as support components used for providing power, for packaging, and for mounting display devices in a hands-free manner, for example, may not be shown in the drawings in order to simplify description of the invention. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two. The term "exemplary" relates to example embodiments and applications that illustrate typical setup and use for the sake of description, without connoting preference or limitation.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces or views of a device and do not describe any necessary orientation of the device. In the context of the present disclosure, the term "hand-held device" relates to portable electronic devices equipped with a display and configured to be viewed and operated while held in the hand, including cell phones, devices such as the iPad (Apple Computer) or Android tablet, and similar devices, for example.

In the context of the present disclosure, the term "coupled" is intended to indicate a mechanical association, connection, relation, or linking, between two or more components, such that the disposition of one component affects the spatial disposition of a component to which it is coupled.

For mechanical coupling, two components need not be in direct contact, but can be linked through one or more intermediary components.

In the context of the present disclosure, the term "image" is used to refer to a "pixelated" image, a pattern comprising the array of pixel data that is recorded from a display screen. The image described herein is a type of pixel pattern or "bitmap", not limited to any specific data format. The related term "image capture", as familiarly used in the software development art, relates to recording, at a point in time, a "snapshot" copy of the pixel array data for a display. For each pixel in the array, this bitmapped image-capture data indicates whether a particular display pixel is in the energized/de-energized state and, optionally, color or other visual attributes of the energized pixel. In pixelated image capture, only an image of the display, as available for the human viewer is captured; the underlying data or logic that ultimately defines the state of the pixel is not recorded. The terms "image capture" and "screen capture" are considered equivalent for the purposes of the present disclosure.

The term "in signal communication" as used in the application means that two or more devices and/or components are capable of communicating with each other in at least one direction via signals that travel over some type of signal path. Signal communication can be wireless.

In the context of the present disclosure, the term "display" may be used as equivalent to "display device", "personal display", "handheld display", "heads-up display", and other variants of these terms, and can include cell phones, various types of display device configured for mounting on the arm or wrist, on clothing, on a cart or other support vehicle, HMDs, or other HUDs. Although not explicitly shown herein, each display device has a supporting processor of some type, rendering received image data on the corresponding display surface and managing signal communication with one or more other processors for exchange of information related to the display function.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

Embodiments described herein show examples that are typical of warehousing applications, which is one of a number of business sectors for which methods and apparatus of the present disclosure can be of particular value. It should be emphasized that warehousing and supply illustrations are given by way of example, not limitation. A common trait for such applications relates to transmitting instructions to inform task execution. Verifying task execution, such as completion of an order fulfillment assignment, and other tracking, can be performed using any of a number of mechanisms, such as using a hand-held scanner or "ring scanner" or similar automated device.

FIG. 1A is a schematic diagram that shows conventional use of a handheld personal display device 10 used to provide alphanumeric information, such as task-oriented instructional information, for a viewer on its display as an image 24. The example of FIG. 1A shows a set of labels 30 and their corresponding variables 32. In this conventional approach, a central server 12, typically a computer or other type of logic processor, communicates through WiFi, or other wireless transmission mechanism, to workers who are awaiting tasks or assignments. Each worker can have a cell phone, smart phone, pad, or other handheld device 10 that is configured to receive server 12 transmissions, sent from a WiFi router 14 or other transceiver as represented in FIG. 1A.

In order to convey the task or order information with informational data fields 16 from server 12, some type of logic interface is required between server 12 and the networked personal display device 10. This interface can be, for example an applications interface or API (Application Programming Interface) that is designed and standardized for a system, or a custom interface designed specifically to communicate instructions for task execution. An app (software application) executing on handheld display device 10 interacts with server 12 to acquire and display text contents. In the example of FIG. 1A, text content that is acquired and displayed in image 24 is in the form of simple text instructions, with one or more data fields 16, typically with one labeled field 16 per line entry as shown.

A notable disadvantage of the conventional instructional display paradigm of FIG. 1A relates to the requirement that the user hold the display device 10 in hand while performing the task of locating and obtaining an item. Unless display device 10 is temporarily set aside or pocketed, user activity is single-handed. Accidents happen, and if the display device 10 is dropped onto a concrete floor, it can be damaged. In addition, the viewer must continually look down to see the displayed image 24 on the hand-held device, which requires repetitive movement and may raise safety concerns.

Figure 1B:
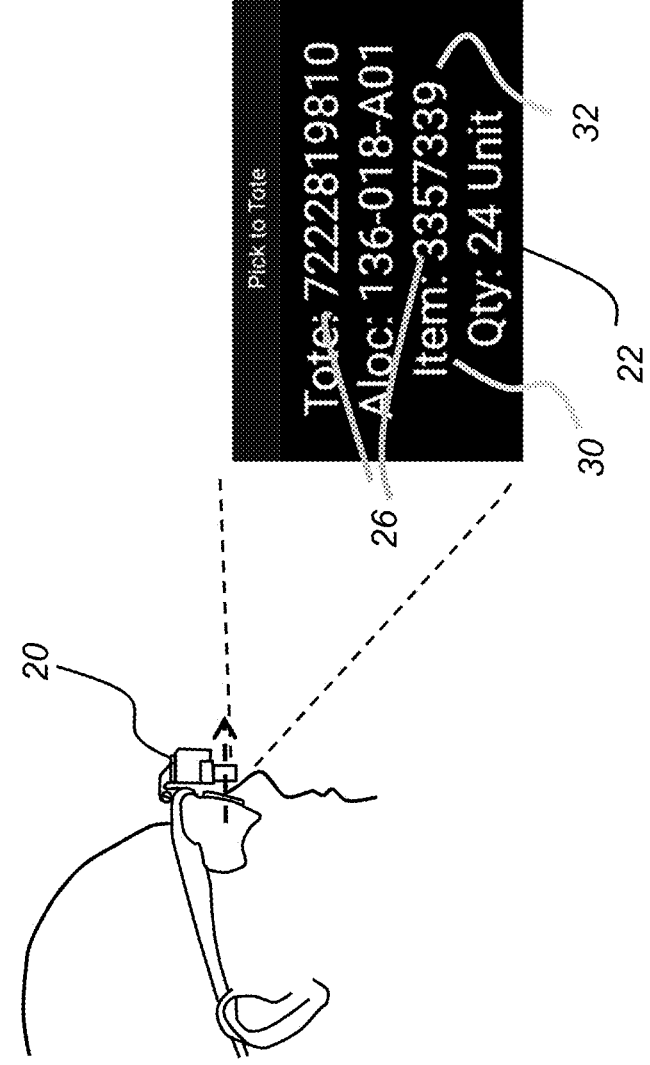
FIG. 1B is a schematic diagram that shows how an exemplary HMD device can complement or replace the use of handheld display devices for providing task-oriented instructional information to the viewer.
Figure 1B:
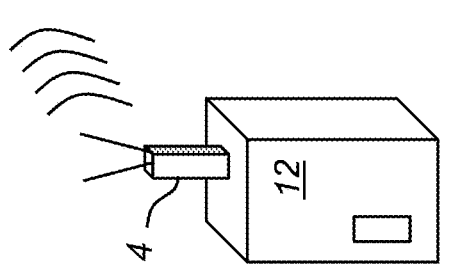

Wearable display devices and other types of hands-free HUD can alleviate some of the problems described for handheld personal display devices 10. FIG. 1B is a schematic diagram that shows how an exemplary HMD device 20 or other HUD can complement or replace the use of a handheld display device 10 for providing task-oriented instructional information to the viewer. HMDs, and HUD devices in general, are hands-free devices, displaying useful information in the visual field of the viewer, but allowing the viewer to walk about or to perform some manual function more safely, for example, or even to drive a cart or vehicle while display 22 is actively operating, and rendering the informational or task-oriented content within the viewer field of view. In the context of the present disclosure, the term "heads-up display" or HUD presents content that supplements the normal visual field of the viewer, rather than requiring that the viewer re-direct attention away from the visual field that lies ahead in order to view the display contents. The HUD can be considered to include any of a range of suitable head-mounted displays (HMD) including glasses, goggles, or display attachments to eyewear, as well as to other display devices that are worn, cart- or vehicle-mounted, or otherwise configured to remain within the visual field of a viewer and to allow hands-free operation simultaneous with the display of content within the viewer's visual field. Illustrative examples are given herein to HMDs; however, the functions and behavior described for HMDs can generally be extended to other types of HUD devices.

It should be emphasized that the methods of the present disclosure, while particularly advantageous when using a hands-free HUD device as second display as described in the examples given herein, can also be used with conventional displays, including a display that may require redirection of viewer vision away from the surrounding scene as the second display.

As can be seen in the simple display 22 example of FIG. 1B, informational fields 26 on the typical HMD device 20 are necessarily space-constrained and, because of this limitation, the HMD 20 can typically allow only a reduced number of terms or may use appropriate abbreviations in order to take up less space. However, in many cases, as suggested in the example of FIGS. 1A and 1B, only a few text fields may be needed in order to provide the essential information for performing a task such as item selection or site-specific function for example.

The overall arrangement of FIG. 1B can use the same communication mechanism for receiving display information from server 12 that was described with reference to FIG. 1A. An app executing on the HMD device may execute in order to obtain data fields from server 12 through an API or custom interface.

As was noted in the background description, communication between the server 12 at the site and the personal display device, whether handheld device 10 as in FIG. 1A or HMD 20 as in FIG. 1B, has typically required some amount of custom integration with computer servers and related hardware at each system or site location. Because there are many potential system combinations and numerous variations, often with customization site-to-site and including customization by different, unrelated software vendors, it can be appreciated that some method for adapting existing data display content to formats readily usable by an HUD system would be advantageous. However, no such facility may exist for straightforward conversion to HUD display for a "legacy" system. For example, existing systems that are configured for instructional display on a smartphone or other hand-held device, may not be readily suited for display on an HMD or wrist-mounted display having limited-sized text fields.

The Applicant solution changes the paradigm of FIGS. 1A and 1B by allowing selected information fields from the source or primary display 10 to be extracted and displayed on any of a number of types of secondary or second display. The second display, as shown in the examples that are given following, is HMD 20. It should be noted that HMD 20 serves as a useful, non-limiting example of a hands-free HUD in the description that follows. Alternate embodiments of the present disclosure can employ some other type of HUD or other display as the second display for rendering one or more text fields that have been extracted from primary display 10.

Using data extraction and re-formatting, the Applicant solution addresses the interface problem by adapting the output of existing software and tools to the interface task without jeopardizing data integrity and without requiring extensive and costly rework for integration with legacy systems and software. Embodiments of the present disclosure thus take advantage of existing systems that are already designed and that already operate for generating instructive text content on a primary display. According to an exemplary embodiment, the primary display can be a hand-held display 10, such as a smartphone or pad display. The Applicant's solution provides methods for accessing the needed text content from the primary display 10, in its displayed image form, obtaining an "image capture" of the hand-held primary display 10 screen, for extracting the needed text content from the obtained "image capture" of the hand-held display 10, then using this extracted content for display on a second device, typically as an HUD image, without requiring an extensive software/hardware development effort.

Figure 2:
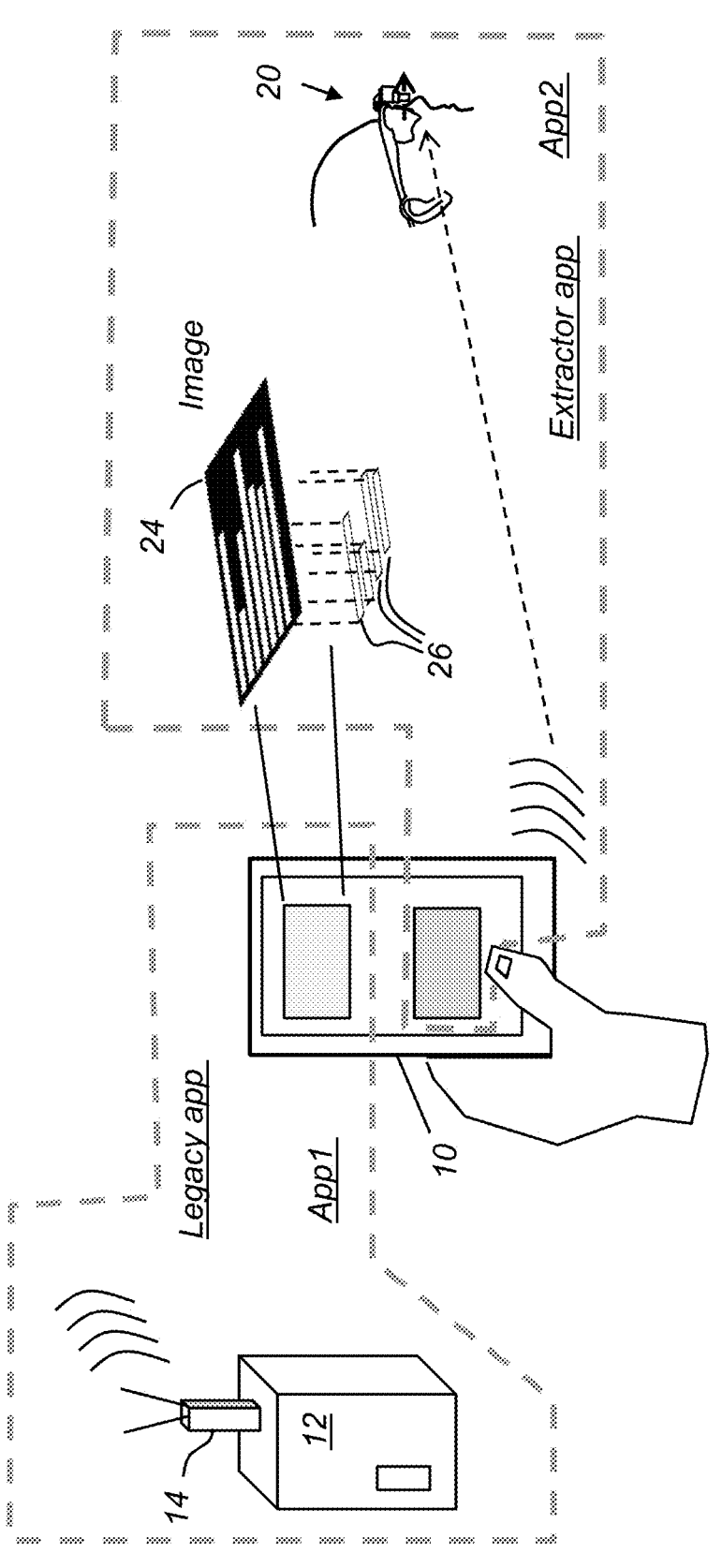
FIG. 2 is a schematic diagram that compares structures and operation of the Applicant solution to the conventional approaches shown in FIGS. 1A and 1B.

The schematic diagram of FIG. 2 compares structures and operation of an embodiment of the Applicant solution to the conventional approaches shown in FIGS. 1A and 1B. With respect to the existing "legacy" application labeled App1, the hand-held display 10 continues to operate as shown in FIG. 1A. That is, server 12 communicates with the hand-held primary display 10, generating image 24 that provides the source for label and variable text content needed for display to the viewer for task execution or other purpose.

In order to extract App1 data for the second display, HMD 20, the Applicant solution adds another software application, App2, to primary display device 10. App2 is labeled in FIG. 2 as an "extractor" application. The extractor App2 operates independently of App1 and may or may not be displayed on device 10. The extractor app App2 can continuously search image 24 (the output of App1) on primary display device 10 to extract data fields 26 for display on a secondary display, here HMD 20. Data fields 26 on primary display device 10 are primarily alphanumeric text data fields.

App2 does not access data from App1 directly, but only uses the displayed output of App1. Thus, instead of processing the data content itself that is used by App1 to generate the displayed text fields, the Applicant's App2 obtains only the displayed, pixelated image 24 of display device 10 as its source for obtaining the text strings of interest from the primary display image. App2 then generates and renders the needed data fields 26 onto the secondary display, shown in FIG. 2 as an HMD display, typically as alphanumeric text strings, providing at least the variable data content and, where possible, the corresponding label(s). According to an embodiment of the present disclosure, App2 can execute as a background function or as a service relative to the primary display 10 device.

Figure 3:
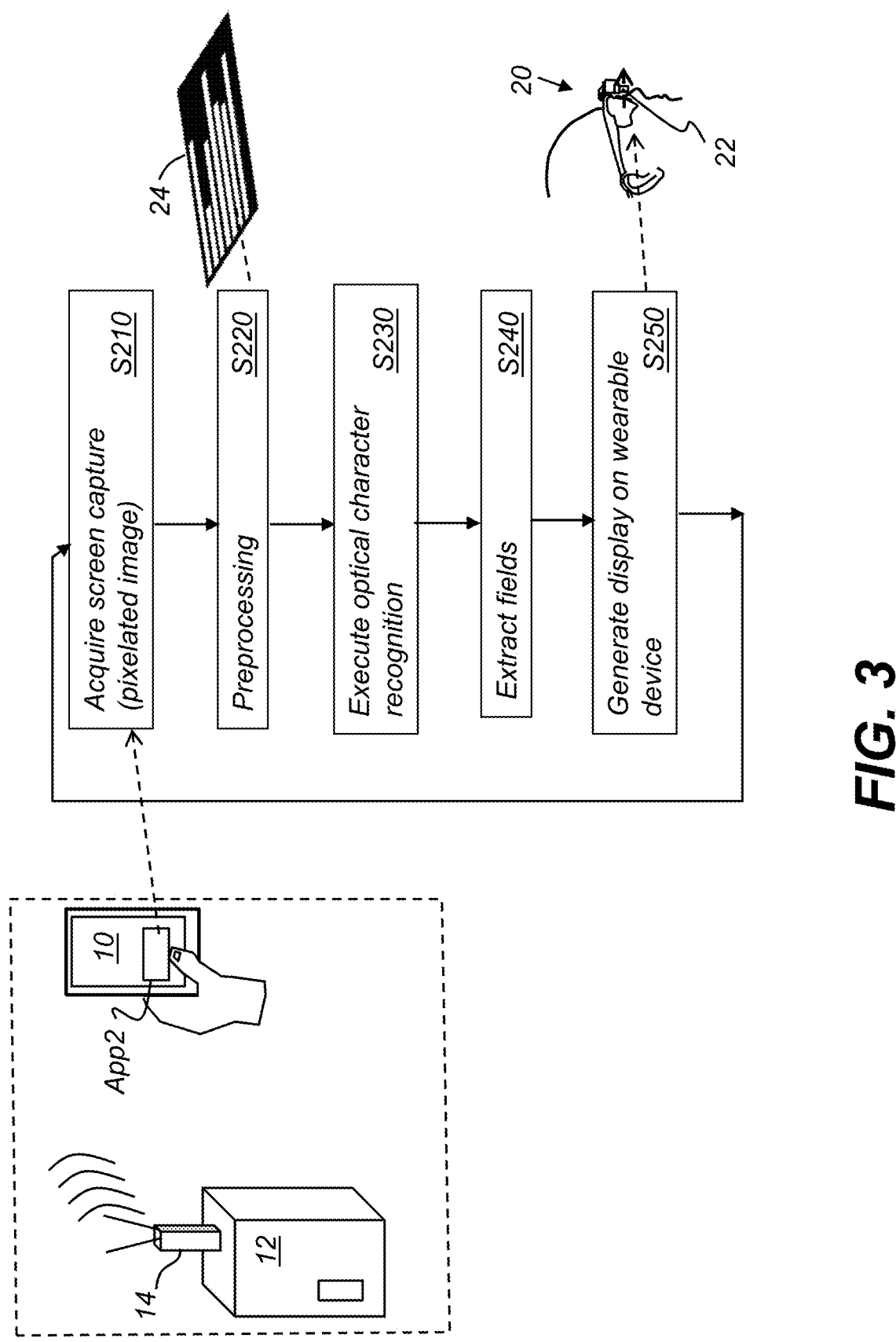
FIG. 3 is a logic flow diagram that shows a sequence for generating HUD image content on a second display using screen capture content from a first display according to an embodiment of the present disclosure.

FIG. 3 is a logic flow diagram that shows how App2 operates. A display image acquisition step S210 executes by acquiring a screen capture from handheld display device 10. Most types of portable personal display devices 10, such as cell phones, provide a native screen capture utility that can be invoked from a software application running on the device. For example, both iPhone™ devices and Android™ devices provide a capture command that generates a pixelated, or bit-mapped, image of the device display screen. As one option, the acquired capture may only obtain bit-map content from some portion of the device display. Step 210 uses the system command for screen capture and acquires the corresponding pixelated image 24 from display 10. A preprocessing step S220 can pre-process the acquired pixel content to distinguish the area of image 24 having content of interest from other parts of the captured screen. Step S220 can include, for example, tasks of eliminating border content, cropping out standard icons that typically display to show status of the cell phone, time, battery charge, and the like, as well as distinguishing display text from unwanted keypad text characters and various icons for unrelated functions. According to some embodiments of the present disclosure, only a partial subset of the display 10 text is needed for task execution; this subset can be extracted from the full body of text that is displayed on display 10. Text intended for further processing and for rendering on the second display device can be identified according to pre-programmed characteristics, as described in more detail subsequently.

An optical character recognition (OCR) step S230 executes on the acquired, pixelated display image 24. OCR step S230 can identify alphanumeric text strings that are presented within pixelated image 24 that has been captured. OCR processing is well-known and can be implemented using custom software or any of a number of OCR software products.

In a fields extraction step S240, App2 searches the identified text strings in the App1 image 24 content for programmed keywords or text "markers" that indicate the text of interest that provide HMD display "labels". This App1 text of interest that is adjacent to or follows the labeling keywords typically includes the related variable text fields to which each respective label applies, needed by App2 for HMD 20 display. According to an embodiment of the present disclosure, the text of interest needed by App2 can be identified by matching to a pre-programmed listing of terms, or alternately be identified by App1 characteristics such as font, color, motion, or other display treatment, or screen position, for example. The text of interest can also relate to input from various sensors or sensing apparatus of the primary or secondary display device, including sensor data relating to orientation, geographical or physical position, ambient light intensity, or other factors.

A display rendering step S250 then generates an HUD display 22 (FIG. 1B) suitable for HMD 20 that shows selected fields to support the given application. The control logic execution shown in FIGS. 2 and 3 can repeat periodically, such as whenever the display 10 is updated, following a confirmation signal provided from the end-user indicating task completion, or as a continuous loop, such as one or more times per second, for example.

Still referring to FIG. 3, if optical character recognition returns ambiguous data or otherwise indicates low confidence in results obtained, the App2 software may not be able to extract text data fields, but can take other measures, such as displaying the acquired screen capture from App1, which may be rendered in scaled form, for example.

In a warehousing application, for example, server 12 assigns tasks for order fulfillment from the warehouse inventory. Specific tasks need to include various information fields that would be common to any order fulfillment scheme. For example, a worker fulfilling a customer order would follow some type of listing that identifies fields such as the following:

(i) Order identifier (ii) Item number or part number (iii) Quantity (iv) Part location (such as aisle number, shelf number, bin designation, and the like).

In the example shown with reference to FIG. 3, the second display is generated on an HMD 20. However, it should be noted that the target device need not be a wearable display, but may be some other type of HUD display or, if needed, a different type of hand-held display screen.

Configuration Setup for App2 Execution

From the computer system, server 12 at any particular site, the needed information given in image 24 can be given in any order, and may appear on various parts of a printed or display surface. According to an embodiment of the present disclosure, the extractor application App2 can be configured to select, perform OCR, and display the desired text strings extracted from the primary screen display 10, based on fixed dimensional coordinates for the display 10 surface. This approach avoids the need to interface directly with server 12 software. However, applying this strategy would require precise knowledge of the dimensional arrangement for display 10 information, which can vary with the specific type or model of personal handheld device. Moreover, modifications or revisions to the image 24 display format or to the display device 10 itself would require re-configuration of the app2 function. The type of reconfiguration needed would be inconvenient, requiring customization at each site, and may be prohibitive for personnel lacking formal computer software skills.

The Applicant solution is to provide the end-user with a configurable interface that identifies text of interest from display 10 using a set of keywords. Exemplary configuration screens for this user interface are shown in FIGS. 4A, 5, 6, and 7. By way of example, a basic logic sequence can proceed as follows:

(i) The OCR utility detects alphanumeric text strings in the source display 10 content.

Figure 4A:
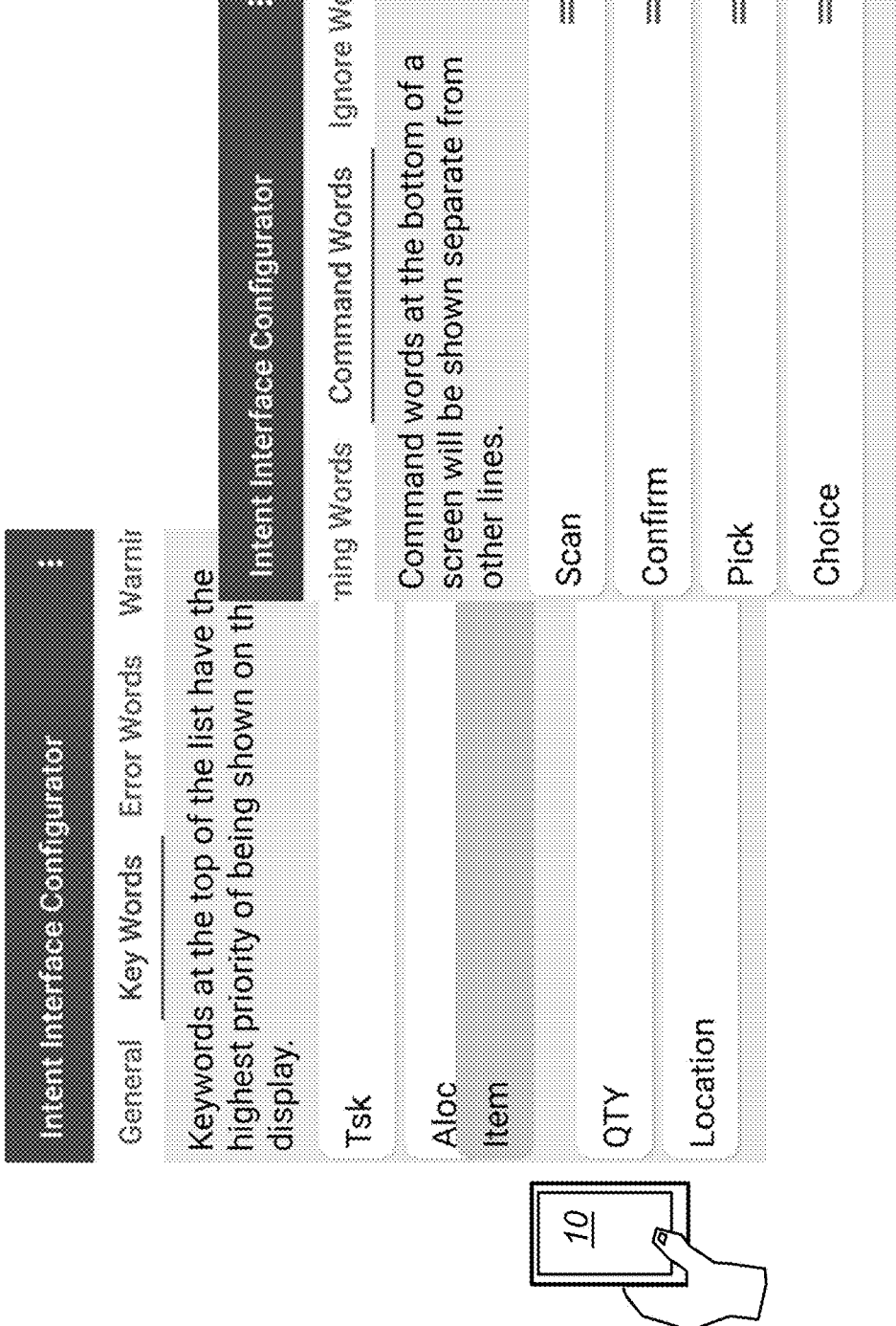
FIG. 4A shows an exemplary user interface for configuration of key word and command word fields.

(ii) Each detected string can be checked against a previously configured listing of keywords. The keywords can identify instructions, or may act as labels for specific information, for example, such as information relevant to a warehouse order fulfillment task. This could include keywords associated with task instructions, part number, order number, quantity, location, for example. An exemplary set of configuration screens for entering and ordering keyword information that can serve as data labels is shown in FIG. 4A.

Figure 4B:
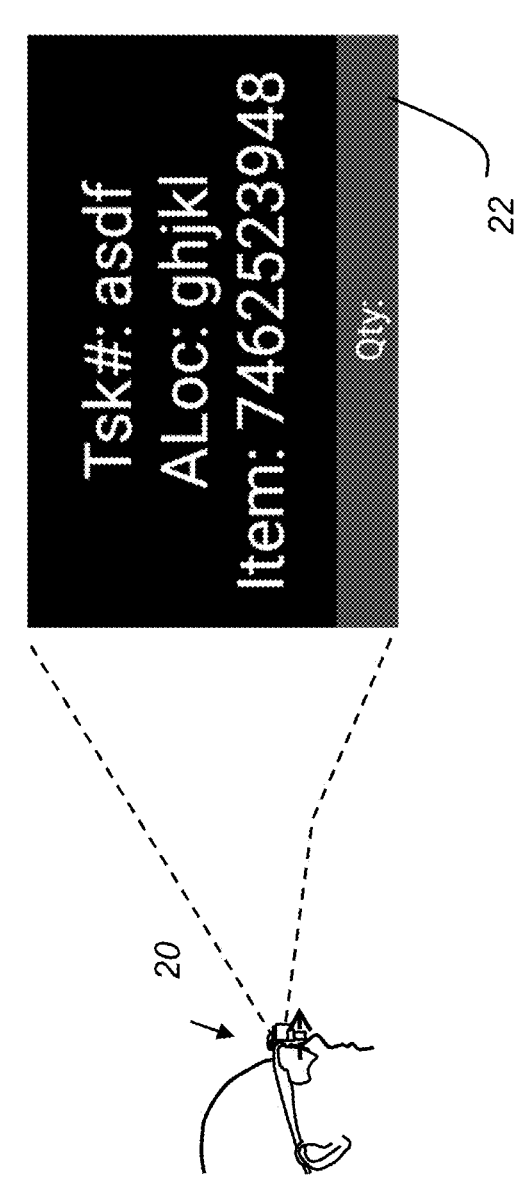
FIG. 4B shows an example of display on a wearable display for the configuration provided in FIG. 4A.

(iii) The variable data string associated with each specified keyword is identified. The keywords and the corresponding data fields to which the keywords apply can then be rendered on secondary display 22 of the HMD 20, as shown in the example of FIG. 4B. Labels, equivalent to the keywords, and the variable alphanumeric content associated with the keywords, can be displayed. Where space is not available, only the variable text content may display, without labeling text, or with labels abbreviated.

(iv) Command terms (FIG. 4A) and other configured fields can optionally be identified and displayed. It should be noted that fields of interest can also be identified by characteristics such as position on the display screen or by display attributes such as font, color, or other text/command treatment.

Figure 5:
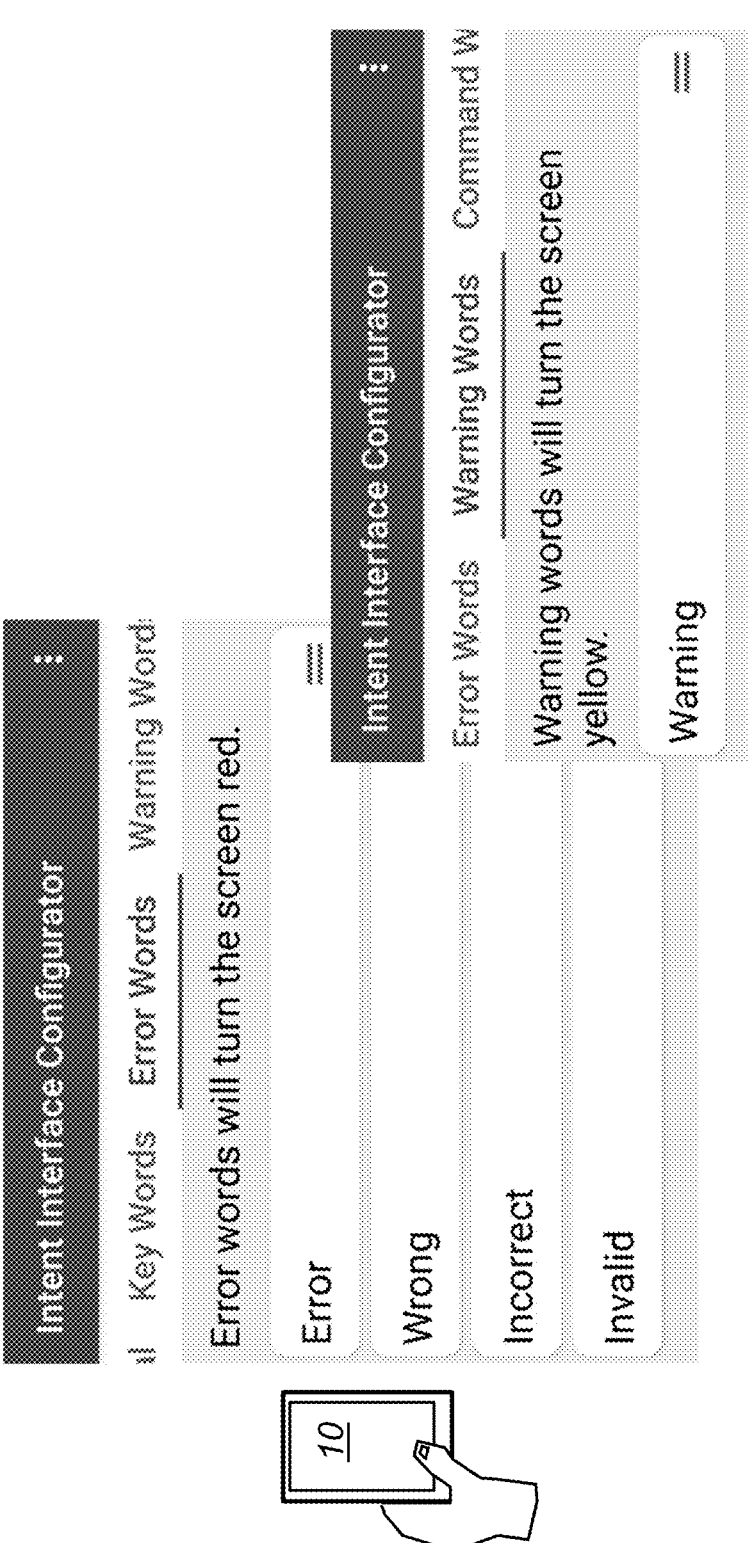
FIG. 5 shows an exemplary user interface for error and warning word configuration.

As shown in the configuration examples of FIG. 5, the user can also enter terms related to warnings, alarms, or errors, including screen response where these terms are detected. This allows the user to define a set of terms that can be recognized by the App2 utility from the display device 10. Identified errors, cautions, and other alert message text can be rendered differently on secondary display 22, such as in a special color or font size, for example, or using blinking or other timing effects.

Figure 6:
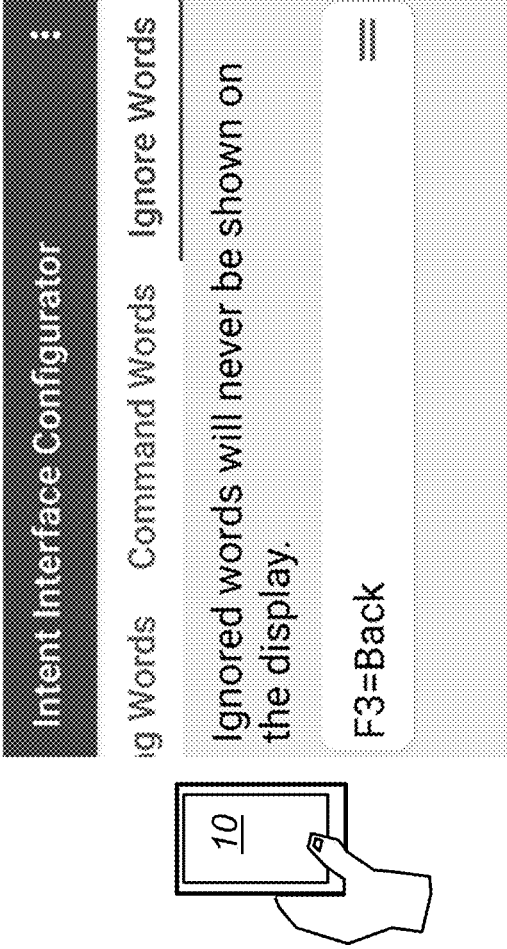
FIG. 6 shows an exemplary user interface for specifying text strings to ignore from the source display.

As shown in the exemplary configuration screen FIG. 6, the user can configure the App2 interface to ignore specified fields in image 24 so that they do not appear on the HUD display 22. This feature can be used to help eliminate informational text for applications in which HUD display 22 allows minimal text content.

Figure 7:
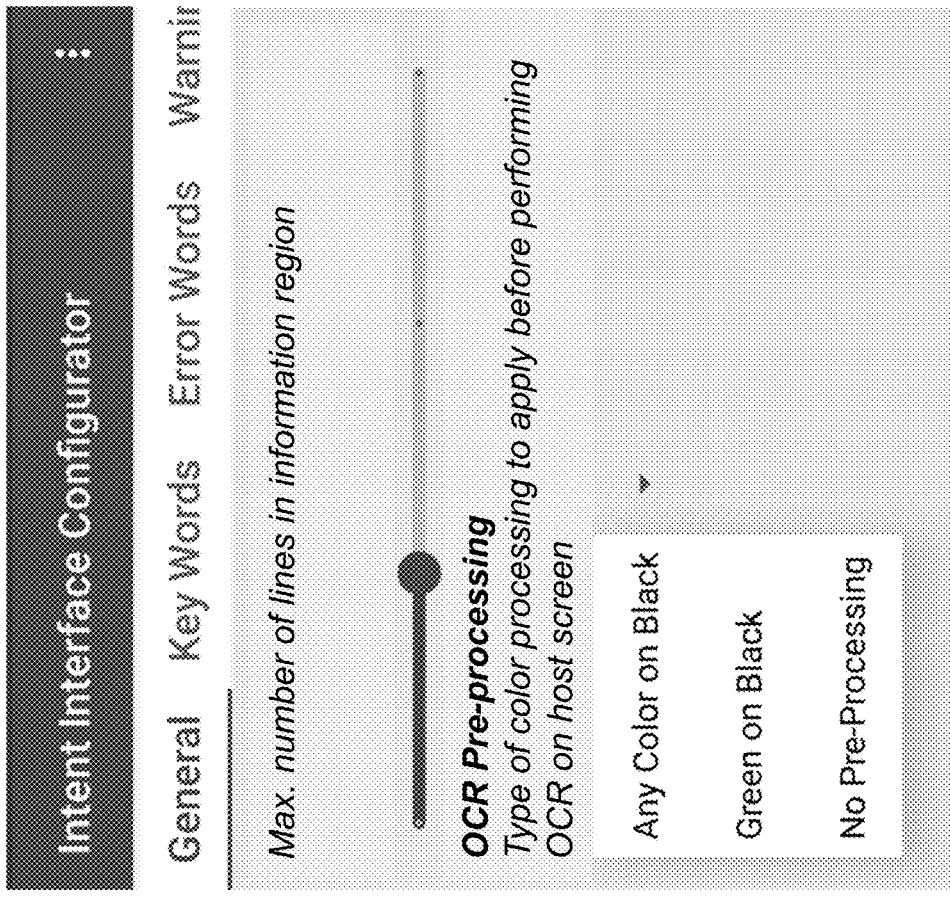
FIG. 7 shows an exemplary user interface for specifying text attributes from the captured screen image.

It should be noted that App2 can continuously execute the sequence of FIG. 3 on the displayed image 24 of display device 10. To avoid confusion where applications other than App1 may control display 10 and may display text data not intended for OCR processing, the App2 configuration utility can allow the user to specify font color and other characteristics of the text of interest within image 24, as shown in the example of FIG. 7. Thus, for example, personal text messages, camera images, or random web page content can be excluded from the OCR processing and display sequence described with reference to FIG. 3.

Because the overall number of fields with information necessary for a particular type of task can be limited and can be readily listed by a client, the extractor App2 can be directly configured by an end-user, rather than requiring the skills of a software developer. As shown in FIG. 1B, for example, only a small number of information fields can be displayed on display 22, particularly in an application where the viewer needs to be able to see real-world objects that lie past the HMD display.

It should also be noted that App2 software can be instructed to substitute, abbreviate, or replace terminology that originally displays from App1 as part of its extracted text for rendering on the second display. This capability can be used, for example, to translate terms from extracted text strings into an alternate language or to employ a regional idiom for rendering on the HUD. Thus, embodiments of the present disclosure can help to simplify and streamline the translation task for adapting the App1 software for users of different languages.

As was described with reference to FIG. 2, the method of the present disclosure does not "communicate" by exchanging data with other software programs. The data that is used to determine the values or identifiers that are displayed on the HUD or other secondary display is taken from OCR interpretation of a screen capture of image 24 from the primary display. The screen capture is thus acquired from an intermediate "primary" display, in this case, from a handheld display 10 such as a cell phone. Optionally, the screen capture could be obtained from a personal computer, pad, smart watch, or other device that is configured with the necessary software logic for communication of commands and instructions from server 12, which may be, for example, a mainframe computer configured to display image 24.

The format of image 24 data can be any format suitable for OCR processing by the App2 application. The pixel image provided from screen capture can be in a proprietary format of the manufacturer of the cell phone or other handheld device. In some cases, the screen capture can be saved in image form, such as a .jpeg or .png image, for example. Because the extractor App2 uses the display image 24, it can be appreciated that instructions and text of interest can also be obtained from images of printed copies or from captured images of other screens or documents.

The invention has been described in detail, and may have been described with particular reference to a suitable or presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method comprising:

(a) rendering an image on a first display device, wherein the first display device is controlled by a first processor;

(b) acquiring, on the first processor, a screen capture, of its rendered image as a pixelated image, comprising text content from its rendered image;

(c) processing the acquired pixelated image using optical character recognition to extract and identify, from the rendered text content, at least a first alphanumeric text string as a label, and a second alphanumeric text string as a variable associated with the identified label;

(d) transmitting, from the first display device to a second display device, the extracted first and second alphanumeric text strings; and (e) rendering the second alphanumeric text string on the second display device, without rendering the identified label.

2. The method of claim 1 wherein processing the acquired image further comprises substituting a pre-programmed text string with at least one of the extracted alphanumeric text strings.

3. The method of claim 1 wherein the first display device is a hand-held device.

4. The method of claim 1 wherein the first display device is a personal computer.

5. The method of claim 1 wherein the second display device is a wearable display device that is in wireless signal communication with the first display device.

6. The method of claim 5 wherein the second display device is a head-mounted display device.

7. The method of claim 1 further comprising refreshing the first display device in response to activity from a viewer of the second display device.

8. The method of claim 1 further comprising excluding one or more of the text strings of the first display from extraction.

9. The method of claim 1 wherein the one or more extracted alphanumeric text strings of the first display are selected according to color.

10. The method of claim 1 wherein transmitting from the first to the second display device is wireless.

11. A method comprising:

(a) acquiring a screen capture, as a pixelated image, comprising text content from a display that is a part of a first display device;

(b) processing the acquired pixelated image on the first display device using optical character recognition to obtain one or more alphanumeric text strings, and identifying, from the obtained alphanumeric text strings, one or more keywords from a predetermined set of keywords;

(c) for at least one of the identified keywords identified in the acquired pixelated image, associating a variable text string obtained from the pixelated image and related to the at least one keyword; and (d) rendering at least the variable text string, and not the associated keyword, on a second display device that is in wireless signal communication with the first display device.

12. The method of claim 11 further comprising identifying, from the one or more keywords, an instruction or warning and rendering the instruction or warning on the second display device and in a different text font, font size, or color from the variable text string.

13. The method of claim 11 further comprising defining the predetermined set of keywords according to stored user entries on the first display device.

14. A hand-held processing apparatus having a first display;

a processor that controls the first display of the hand-held processing apparatus and that is programmed to acquire a screen capture of the first display as a pixelated image and to identify and extract, using optical character recognition, at least a first alphanumeric text string as a label, and a second alphanumeric text string as a variable associated with the identified label; and a transmitter that is energizable by the processor to wirelessly transmit the one or more extracted text strings from the hand-held processing apparatus to a remote device having a second display, wherein the remote device is configured for rendering the transmitted second alphanumeric text string, without rendering the associated label.

15. The apparatus of claim 14 wherein the processor is further programmed to direct the transmitter to wirelessly transmit a portion of the pixelated screen capture image to the remote device.

* * * * *